United States Patent [19]

Howell

[11] 4,428,019
[45] Jan. 24, 1984

[54] GROUND FAULT CIRCUIT INTERRUPTING DEVICE WITH IMPROVED INTEGRATED CIRCUIT POWER SUPPLY

[75] Inventor: Edward K. Howell, Simsbury, Conn.

[73] Assignee: General Electric Company, New York, N.Y.

[21] Appl. No.: 260,511

[22] Filed: May 4, 1981

[51] Int. Cl.³ .............................................. H02H 3/33
[52] U.S. Cl. ...................................... 361/45; 361/113
[58] Field of Search ...................... 361/44, 42, 45, 46, 361/47, 48, 113; 363/127; 307/55, 58

[56] References Cited

U.S. PATENT DOCUMENTS

| | | | | |
|---|---|---|---|---|
| 2,953,738 | 9/1960 | Bright | ................................. | 363/127 |
| 3,852,642 | 12/1974 | Engel et al. | ............................. | 361/45 |
| 3,973,171 | 8/1976 | Howell | ................................. | 361/45 |
| 4,180,841 | 12/1979 | Engel | ....................................... | 361/45 |
| 4,216,516 | 8/1980 | Howell | ................................. | 361/45 |
| 4,290,004 | 9/1981 | Smith | ................................. | 307/55 X |

Primary Examiner—Patrick R. Salce
Attorney, Agent, or Firm—Richard A. Menelly; Walter C. Bernkopf; Fred Jacob

[57] ABSTRACT

An integrated circuit ground fault signal processor utilizes a power supply having a first, regulated, half-wave rectified supply voltage section and second DC supply voltage section. Operating current for a fault signal amplifier and charging current for a fault signal integrating capacitor are drawn from the second power supply section on a full-cycle basis. Operating current for a trip threshold detector or comparator and a high frequency oscillator circuit is drawn from the first power supply section for operation on an alternate half-cycle basis.

5 Claims, 5 Drawing Figures

GROUND FAULT CIRCUIT INTERRUPTING DEVICE WITH IMPROVED INTEGRATED CIRCUIT POWER SUPPLY

REFERENCE TO RELATED APPLICATIONS

The instant application is related to applicant's commonly assigned, concurrently filed patent applications entitled Ground Fault Circuit Interrupting Device With Improved Thyristor Triggering (Ser. No. 260,512, filed May 4, 1981), Ground Fault Circuit Interrupting Device With Improved Coordination of Electronic Circuit Operation (Ser. No. 260,513, filed May 4, 1981), and Improved Ground Fault Circuit Interrupting Device (Ser. No. 260,515 filed May 4, 1981).

BACKGROUND OF THE INVENTION

The present invention relates to ground fault circuit interrupting (GFCI) devices and particularly to an improved integrated circuit ground fault signal processor therefor.

GFCI devices are presently enjoying wide application in certain residential circuits, on construction sites and in industry to protect personnel from potentially injurious electrical shock should they become involved in a line-to-ground fault. Such devices are typically available in either a circuit breaker configuration acceptable in a conventional circuit breaker load center or a receptacle configuration acceptable in a conventional wall outlet box. To achieve their acceptability in such existing facilities, GFCI devices must be dimensionally comparable to conventional circuit breakers and receptacles lacking ground fault protection capability. Consequently, the components operating to afford ground fault protection must be highly miniaturized to accommodate being packaged in very little available space. Thus, the requisite electronics should be implemented in integrated circuit form. Discrete components should be compact in size and as few in number as possible. The cores of the requisite differential current transformer and double grounded neutral transformer must also be quite small.

Since, in both the GFCI breaker and receptacle configurations, the components are typically housed in a molded insulative case, power consumption of the electronic components must be kept low in order to minimize internal temperature rise. As is well understood, heat has a particularly detrimental effect on the reliability, stability and life of electronic elements, whether in discrete or integrated circuit form.

GFCI receptacles have required full-wave rectification of the line current sine wave for the power supply in order to achieve full-wave operation since the phase relationship of the ground fault signal and the signal processor operating power derived from the line current is not fixed, i.e. the line and neutral connections with the distribution circuit can be readily reversed during installation. This cannot be done when installing a GFCI breaker, and thus half-wave rectification is sufficient assuming proper hard wire connectors of the differential transformer secondary winding terminations to the signal processor have been made during manufacture. Consequently, the GFCI modules differ in this respect and are not interchangeable as between circuit breakers and receptacles, a distinct disadvantage from a manufacturing standpoint.

It has been found that detection of, for example, a positive ground fault signal voltage alone can contribute to failure in meeting specified trip-time requirements in the special situation when the GFCI device is closed in on a pre-existing, severe ground fault condition at the beginning of a negative half-cycle of the power supply voltage with the ground fault signal being out of phase with the supply voltage. Under these circumstances, it would be necessary for the signal processor to also respond to a relatively large negative ground fault signal voltage in a manner such that a trip function can be executed within allowable trip time limits.

It is accordingly an object of the present invention to provide an improved ground fault circuit interrupting device.

A further object is to provide a ground fault circuit interrupting device of the above character wherein power consumption of the ground fault signal processor is minimized.

An additional object is to provide a ground fault circuit interrupting device of the above character wherein ground fault signal detection is carried out on a full-cycle basis.

Another object is to provide a ground fault circuit interrupting device of the above character which includes an integrated circuit signal processor capable of application in either a GFCI circuit breaker configuration or a GFCI receptacle configuration.

A further object is to provide a ground fault circuit interrupting device of the above character, which is efficient in construction, convenient to manufacture and reliable in operation.

Other objects of the invention will in part be obvious and in part appear hereinafter.

SUMMARY OF THE INVENTION

In accordance with the present invention, there is provided a ground fault circuit interrupting device which utilizes an improved integrated circuit signal processor. Included in the signal processor is a differential amplifier capable of responding to either polarity of ground fault signal voltage above an established threshold level, as appearing in the secondary winding of a differential current transformer. The amplifier controls the flow of charging current for an integrating capacitor as a function of the fault signal magnitude. A comparator senses the voltage developing across the integrating capacitor and conditions a drive to deliver a pulse to the gate of a thyristor when the integrating capacitor voltage achieves an established trip threshold level. This gate pulse triggers a thyristor into conduction to thus draw current from the ground fault protected AC distribution circuit sufficient to actuate a trip solenoid which then effects separation or tripping of fault clearing, circuit interrupting contacts.

An oscillator is connected to drive the primary winding of a second current transformer linked with the neutral conductor of the protected distribution circuit. If the neutral conductor is subjected to a downstream, low impedance ground fault, a circulating current is developed in the neutral conductor of sufficient magnitude to produce a threshold exceeding ground fault signal voltage, and the GFCI contacts are tripped open.

To operate these verious integrated circuit components on an energy-efficient base, there is provided a power supply having a first section in which is developed a regulated, half-wave rectified supply voltage and a second section connected by a diode with the first section and also connected with a filter capacitor, such as to develop a DC supply voltage. Operating current for the amplifier and charging current for the integrating capacitor are obtained from the second power supply section for operation on a full-wave basis. On the other hand, operating current for the oscillator and comparator is obtained from the first power supply section, and thus these components are operated on a half-wave basis. The thyristor gate driver draws triggering pulses from both power supply sections and thus is afforded priority over the other operating components to all the operating current the power supply has to offer. Reliable thyristor triggering is thus assured.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several views of the drawings.

DETAILED DESCRIPTION

Figure 1:
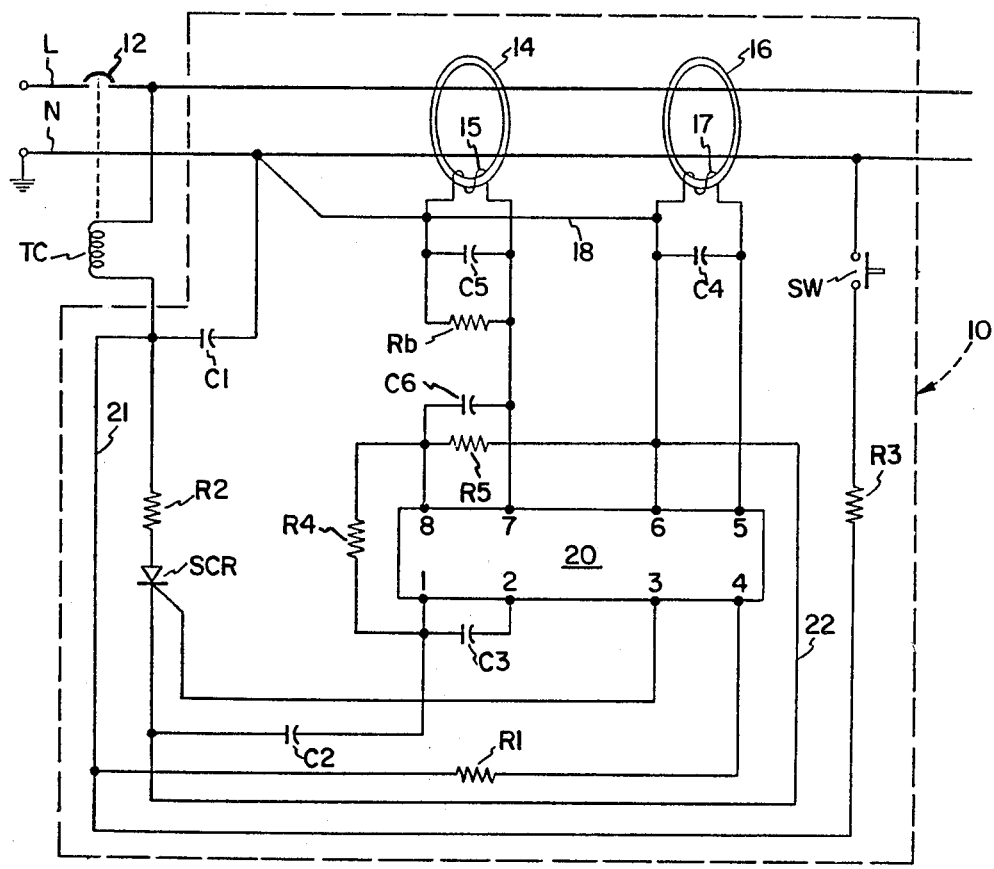
FIG. 1 is a circuit schematic diagram, partially in block diagram form, of a ground fault circuit interrupting device constructed in accordance with the present invention.

Referring to FIG. 1, the ground fault circuit interrupter (GFCI) module of the invention, generally indicated at 10, is adapted to sense ground fault currents in a typical residential power distribution circuit consisting of a line conductor L and a neutral conductor N; the latter being grounded at its source end as shown. When the GFCI module is implemented in a circuit breaker configuration, the line side of the circuit is interrupted by contacts 12. However, if the module is utilized in a receptacle configuration, interrupting contacts are included in both sides of the circuit for reasons well understood in the art. The line and neutral conductors pass through the toroidal core 14 of a differential current transformer and the toroidal core 16 of a neutral excitation current transformer. The former transformer senses any imbalance in the currents flowing in the line and neutral conductors occasioned by a ground fault condition, while the latter induces any imbalancing current in the neutral conductor in the event it experiences a low impedance fault to ground downstream from the GFCI module, all as well understood in the art.

Wound on core 14 is a multi-turn secondary winding 15 having one of its terminations directly connected to the neutral conductor by a lead 18 which also runs to pin 6 of an eight-pin integrated circuit chip, generally indicated at 20. The other termination of this secondary winding is connected to pin 7 of the chip which, as will be seen, constitutes one input port of an amplifier. Connected across the terminations of secondary winding 15 are an RF bypass capacitor C5 and a burden resistor Rb. Winding 17 for core 16 is also terminated at one end in common with lead 18 and pin 6 of the integrated circuit chip. The other termination of this winding is connected to pin 5. As will be seen, pin 5 is the output port for an oscillator driving the parallel resonant circuit including winding 17 and a capacitor C4.

Electrical connection of module 10 with line conductor L is made through the operating coil TC of a trip solenoid, a lead 21, and a dropping resistor R1 to pin 4 of chip 20. The lower end of coil TC is also connected to the neutral conductor through a current limiting resistor R2, a thyristor SCR, lead 22 and lead 18. The gate of thyristor SCR is connected to a source of gate pulses appearing at pin 3 of the chip for triggering the thyristor into conduction and thus drawing activating current through the trip coil to initiate separation of contacts 12 in response to a sensed ground fault condition. A capacitor C1 connects the lower end of coil TC to the neutral conductor to suppress high frequency noise, high voltage transients and spurious dv/dt thyristor triggering. Also connecting the lower end of coil TC to the neutral conductor is the series combination of a test switch SW and a current limiting resistor R3. Closure of the test switch draws trickle current through the trip coil which is seen to bypass the differential current transformer in the same manner as true line-to-ground fault current. This current is of a magnitude somewhat in excess of the established trip threshold, e.g., five milliamps, but well below the requisite trip solenoid activation level. Thus, if the GFCI module is functioning properly, thyristor SCR is triggered into conduction to then draw current of activating proportions through the coil TC, and contacts 12 are tripped open. It will be appreciated that by connecting test switch SW and resistor R3 into the circuit in this manner, rather than directly across the line and neutral conductors as in past practice, the impedance of the trip coil and capacitor C1 afford effective high voltage transient protection for the test switch.

Still referring to FIG. 1, a filter capacitor C2 is connected from pin 1 to pin 6 via lead 22. As will be seen, this capacitor serves to provide a filtered, regulated DC power supply voltage for operating the module integrated circuit amplifier on a full-wave basis. An integrating capacitor C3 is connected between pins 1 and 2 which constitute the amplifier output terminals. The other amplifier input with pin 7 is pin 8 to which a bias voltage is applied from the junction between resistors R4 and R5 of a voltage divider connected between pins 1 and 6. An RF bypass capacitor C5 is connected across the amplifier input ports, pins 7 and 8.

From the description thus far, it will be noted that the module circuitry associated with chip 20 does not include discrete rectifying diodes. As will be seen, GFCI module 10 utilizes on-chip half-wave rectification which nevertheless accommodates full-wave amplifier operation for response to out-of-phase ground fault currents occasioned by the inadvertant reversal of the line and neutral connections with the module. Thus, the module associated circuitry seen in FIG. 1 is applicable to both GFCI circuit breaker and receptacle configurations. Also, phasing considerations with regard to the connections of windings 15 and 17 into the circuit are eliminated, thus affording additional manufacturing conveniences and economies. Also to be noted is the fact that chip 20 has only eight pins, thus constituting a significant reduction in chip size and cost, as well as the number of potential noise entry ports, as compared to past constructions. As regards the eight ports, noise entry is effectively blocked by the various capacitors shown. Also reduced to a significant extent are the number of resistors and wires in the circuitry associated with chip 20.

Figure 2:
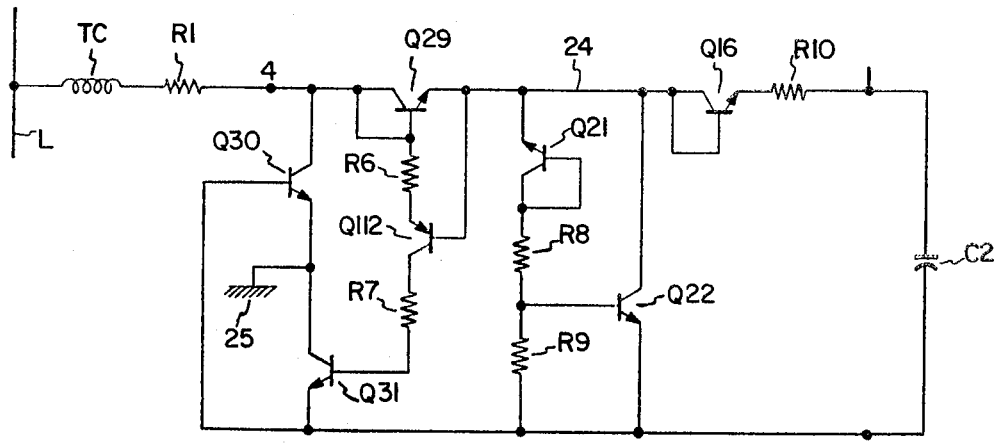
FIG. 2 is a detailed circuit schematic diagram of a power supply utilized in the ground fault circuit interrupting device of FIG. 1.

Turning to FIG. 2, on-chip half-wave rectification of the AC line voltage is provided by diode-connected transistor Q29 whose collector and base are connected in common to power supply input pin 4, which, as also seen in FIG. 1, is seen to be connected to line conductor L through coil TC and dropping resistor R1. Thus operating current appears on bus 24 connected with the emitter of transistor Q29 during the positive half-cycles of the line voltage. The base-emitter voltage of this transistor creates a small collector current in transistor Q112 which constitutes base current for transistor Q31. This latter transistor thus saturates during the positive half-cycles of current on bus 24 to tie the then relatively negative pin 6, common with its emitter, to the chip substrate, indicated at 25 and to which its collector is connected. Resistor R6 in the emitter circuit of transistor Q112 limits current, while R7 in the base circuit of transistor Q31 limits frequency response. Transistor Q21 is connected as a zener diode in series with resistors R8 and R9 between bus 24 and pin 6. When the positive voltage on bus 24 exceeds the emitter-base zener characteristic of this transistor, base current is made available to turn transistor Q22 on. Thus, transistor Q22 clamps the positive voltage on bus 24 to a regulated level corresponding to the zener voltage of transistor Q21 plus its own base-emitter voltage. This configuration provides essentially a zero temperature coefficient for the regulated, half-wave rectified supply voltage on bus 24. As will be seen, this supply voltage powers the oscillator and comparator SCR gate driver sections of the chip integrated circuit on a half-wave basis, while the voltage at the base of transistor Q22 is utilized to control the oscillator, the comparator and an SCR gate clamp.

Still referring to FIG. 2, during the negative half-cycles of the line voltage, when pin 6 is positive relative to pin 4, the base-collector junction of transistor Q30 serves as a forwardly poled diode conducting current from neutral conductor N, pin 6, pin 4, dropping resistor R1 and trip coil TC to line conductor L. It will be recognized that transistor Q30 is thus placed in its inverted mode such that its collector serves as an emitter and its emitter as a collector. In saturation, this transistor connects substrate 25 to pin 4, the most negative point in the circuit during negative half-cycles of the line voltage. This switching arrangement to insure that the substrate is always connected to the most negative circuit point throughout the AC line voltage sine wave avoids the parasitic vertical and lateral PNP transistor effects that would occur if the substrate were always connected to pin 6.

Connected with bus 24 is diode-connected transistor Q16 through which current is conducted during positive half-cycles to charge power supply filter capacitor C2 connected between pins 1 and 6. A buffer resistor R10 is included in this charging path to limit high frequency charging current from the oscillator-produced ripple on the regulated voltage at bus 24. Once capacitor C2 is charged up, it will hold the voltage at pin 1 to a regulated supply level which is one diode drop down (base-emitter voltage of transistor Q16) from the regulated voltage level on bus 24. This voltage level at pin 1 will be sustained with only a slight decay through the negative half-cycles of the line voltage, and thus, as will be seen, is available on an effective full-wave basis to power the amplifier circuit.

From the foregoing description, it is seen that by virtue of the illustrated partitioning of the power supply circuit, such that the amplifier and integrating capacitor C3 are powered from the filtered DC supply voltage at pin 1 and the remainder of the module circuitry from the half-wave unfiltered supply voltage on bus 24, current drain from the filter capacitor C2 during normal operation is reduced to the extent that a small, non-electrolytic filter capacitor may be utilized with attendant reliability and cost advantages.

Figure 3:
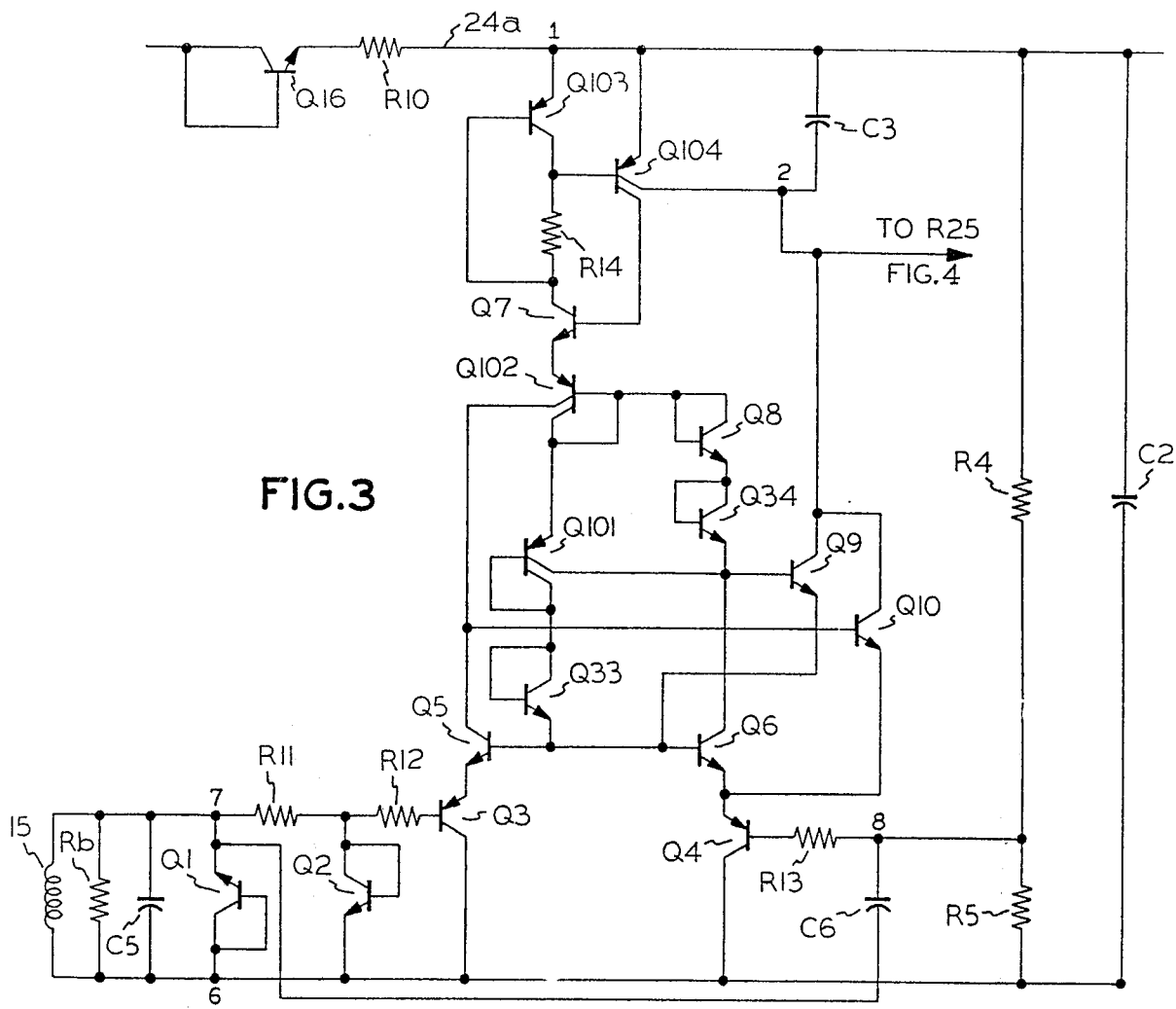
FIG. 3 is a detailed circuit schematic diagram of an amplifier utilized in the ground fault circuit interrupting device of FIG. 1.

The integrated circuit differential amplifier utilized in the GFCI module is detailed in FIG. 3. As was described in connection with FIG. 1, one termination of differential current transformer 15 is commonly connected with neutral conductor N and pin 6 of integrated circuit chip 20. The other winding termination connection is made to pin 7. Burden resistor Rb, connected thereacross, is of a relatively low value to reduce ground fault signal amplitude and thus accommodate the use of a low-cost ferrite core 14 in the differential current transformer. Reversely poled diode-connected transistors Q1 and Q2 clamp large signal voltages at pin 7 to safe levels and thus prevent disabling overdriving of the amplifier. The base of transistor Q3, constituting one amplifier input, is connected to pin 7 through resistors R11 and R12. The other amplifier input is the base of transistor Q4 which is connected through a resistor R13 to pin 8. As described in FIG. 1 and as also shown in FIG. 3, pin 8 is referenced to a bias voltage developed at the junction of resistors R4 and R5 serially connected between pins 1 and 6. Pins 7 and 8 are RF bypassed by capacitor C6, as seen in both FIGS. 1 and 3.

To avoid excessive current drain on the filtered supply voltage at pin 1, the differential amplifier utilizes a current source to supply exceptionally low operating current in the three to five microampere range. This current source includes transistors Q103, Q104 and Q7 and associated resistor R14 seen in FIG. 3. The emitters of transistors Q103 and Q104 are connected to bus 24a common with pin 1, while the base of the latter is connected to the collector of the former. The collector of transistor Q7 is connected directly to the base of transistor Q103 and to the commonly connected base of transistor Q104 and collector of transistor Q103 through resistor R14. One collector of dual-collector transistor Q104 is connected to the base of transistor Q7, while its other collector is connected to pin 2 and the lower side of integrating capacitor C3. In essence, transistors Q104 and Q7 form a latching PNPN (SCR) structure, with transistor Q103 and resistor R14 regulating the current. The primary path of collector current for transistor Q7 is through resistor R14 and the collector of transistor Q103 which is essentially connected as a diode. The collector-emitter voltage of transistor Q103 and hence the base-emitter voltage of transistor Q104 is less than the base-emitter voltage of transistor Q103 by the voltage drop in resistor R14. Since the collector current of transistor Q104 is the base current of transistor Q7, and the collector current of transistor Q103 is the collector current of transistor Q7, the ratio of the transistor Q103 and Q104 collector currents is the current gain of transistor Q7. The difference in the base-emitter voltages of transistors Q103 and Q104, which is the voltage drop across resistor R14, must satisfy the diode equation for this current gain. Since the relationship between base emitter voltage and collector current is logarithmic, variations in the transistor Q7 current gain, such as with temperature, result in relatively minor variations in the established current of the amplifier current source. Moreover, the effect of transistor Q7 output admittance is so small that the established current, preferably in the three to five microampere range, is virtually independent of variations in the supply voltage. Although zero current is also a stable condition for this current source, the inherent thermal leakage current and capacitive coupling with the substrate provides sufficient current to achieve a closed loop gain in excess of unity and thus insure turn-on.

The amplifier operating current provided by this current source, appearing as the emitter current of transistor Q7, is divided essentially equally between the dual collectors of transistor Q102 supplying current to the two legs of the amplifier. Thus, one collector of transistor Q102 is connected to the collector of transistor Q5, while its other collector is connected to the collector of transistor Q6 through diode-connected transistors Q8 and Q34. Common base current for transistors Q5 and Q6 is obtained from the diode-connected portion of dual collector transistor Q102, the diode-connected portion of dual collector transistor Q101, and diode-connected transistor Q33.

At zero ground fault signal, the bias voltage at the base of transistor Q4 raises the emitter voltage of transistor Q6 above that of the emitter of transistor Q5. Since the voltage on the bases of transistors Q5 and Q6 in one base-emitter drop up from the transistor Q6 emitter voltage, transistor Q5 is driven into saturation. The collector voltage of transistor Q5 approaches the emitter voltage of transistor Q6, and thus output transistor Q10, with its base connected to the collector of transistor Q5 and its emitter connected to the emitter of transistor Q6, is cut off. A second output transistor Q9 is shown with its base connected to the junction of the transistor Q34 emitter, the transistor Q6 collector and the other collector of dual collector transistor Q101 and its emitter connected to the base of transistor Q6. With zero signal, the base of transistor Q9 sits at a voltage somewhat more negative than its emitter voltage, and thus is also cut off. Since the collectors of these two output transistors are connected in common to pin 2, no charging current is drawn through integrating capacitor C3.

When the positive peak of a group fault signal voltage applied to the base of transistor Q3 exceeds the bias or reference voltage at the base of transistor Q4, the collector voltage of transistor Q5 rises to provide base drive for output transistor Q10. This transistor turns on to conduct charging current for integrating capacitor C3. The resulting emitter current raises the emitter voltage of transistors Q4 and Q6, and thus reduces the collector voltage of transistor Q5 in feedback fashion. Since this feedback voltage raises the base-emitter voltage of transistor Q4 with additional transistor Q10 emitter current, the logarithmic diode equation provides that the intergrating capacitor charging current increases exponentially with signal voltage. Thus, trip time decreases as an exponential function of increasing ground fault current above trip threshold as is required.

Since the amplifier is operational on a full-wave basis, it is equipped to respond to relatively high level negative signal voltages sufficient to pull the base of transistor Q6 down to a level cutting it off. The collector currents of transistor Q101 drive the bases of transistors Q5 and Q9, and relative high charging current is conducted through the collector-emitter circuit of the latter to rapidly charge integrating capacitor C3 such that a trip can be initiated at the beginning of the next positive half-cycle of the power supply voltage on bus 24 in the manner described in conjunction with FIG. 4.

It will be noted that integrating capacitor C3 is shunted by one of the emitter-collector circuits of transistor Q104, and thus the above-described amplifier current source also serves to provide a constant, low level reset or capacitor discharge current in the nanoamp range. Thus, spuriously accumulated charge occasioned by noise, etc., it continuously drained off, thus to avoid nuisance tripping.

Figure 4:
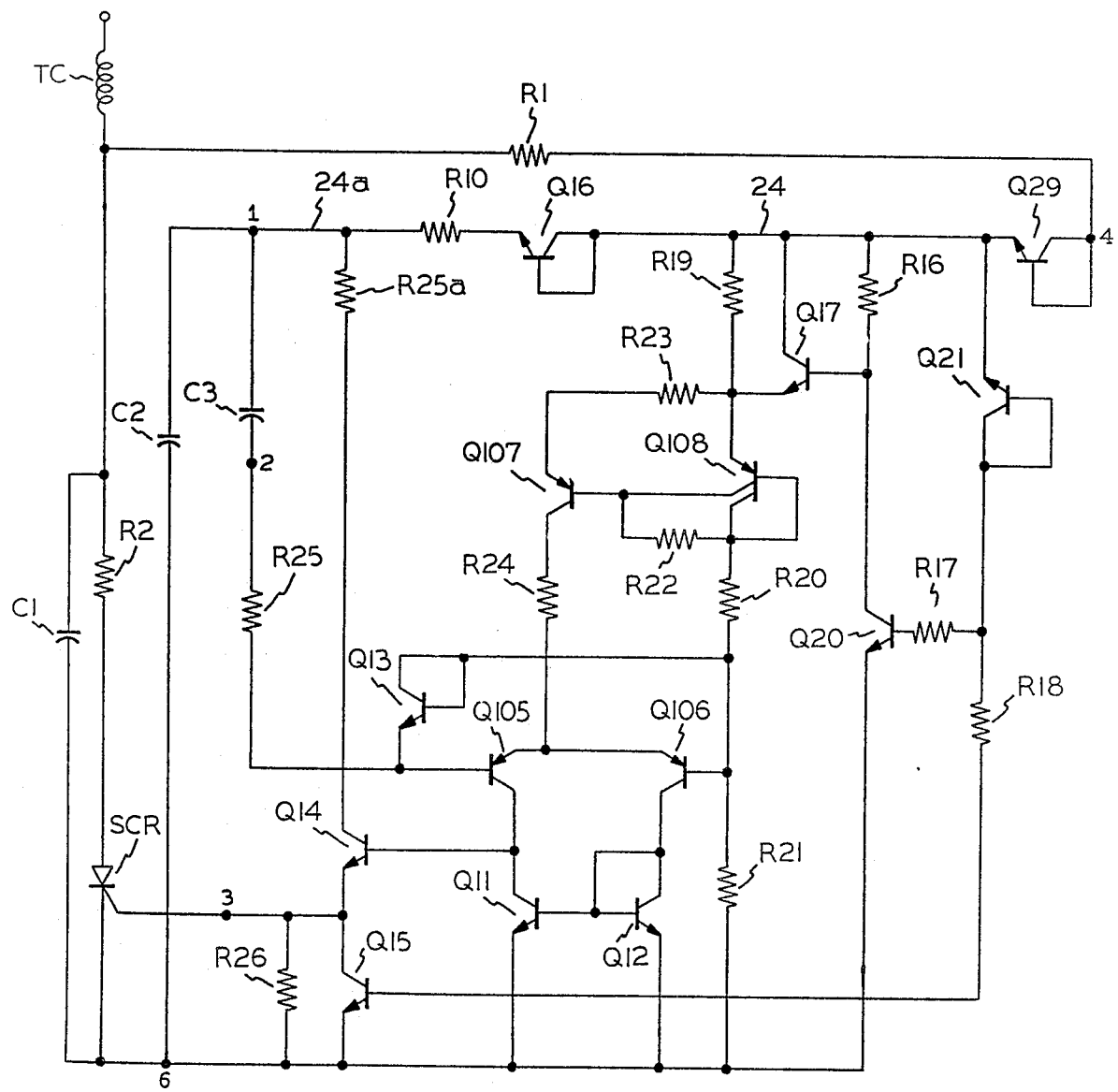
FIG. 4 is a detailed circuit schematic diagram of a comparator and thyristor gate driver utilized in the ground fault circuit interrupting device of FIG. 1.

When the charge on integrating capacitor C3 reaches a given level, a comparator and SCR gate driver circuit seen in FIG. 4 acts to initiate tripping to open contacts 12 (FIG. 1). Operating power for this circuit is obtained from the unfiltered, half-wave rectified and regulated voltage appearing on bus 24 of the power supply circuit described in conjunction with FIG. 2 and illustrated in part in FIG. 4. Actually power is applied in a strobing fashion via transistor Q17 whose collector is directly connected to bus 24 and base connected thereto through a resistor R16. As will be seen, when the supply voltage is below regulation, transistor Q17 serves as a diode applying its emitter voltage as supply voltage for the comparator. When the supply voltage on bus 24 achieves the zener voltage of transistor Q21, base drive is applied through a resistor R17 to a transistor Q20. When the base-emitter voltage of transistor Q20 is exceeded, it conducts to pull the base of transistor Q17 down and thus reduce the comparator supply voltage. At the same time, base drive from transistor Q21 is applied through resistor R18 to transistor Q15 and it goes into conduction one base-emitter voltage drop above the transistor Q21 zener voltage to clamp the gate of thyristor SCR connected to pin 3.

It is seen that the peak supply voltage applied to the comparator is one base-emitter voltage drop (transistor Q17) down from the regulated voltage on bus 24 which is essentially the same as the filtered supply voltage at pin 1 and bus 24a by virtue of diode-connected transistor Q16. It will also be noted that the peak comparator supply voltage occurs early in the positive half-cycle when regulation begins and again late in the positive half-cycle when regulation ends. During the interval between these peaks, the comparator is operated at approximately half the peak supply voltage by virtue of resistor R19 shunting the collector-emitter circuit of transistor Q17.

The emitter of transistor Q17 is connected through the diode-connected portion of dual-collector transistors Q108 and thence to pin 6 through a voltage divider consisting of resistors R20 and R21. This voltage divider establishes a peak reference voltage at the base of comparator transistor Q106 of, for example, 3.5 volts for the two comparator supply voltage peaks during each positive half-cycle and thus an intervening reference of 1.75 volts. The other collector of transistor Q108 is connected to the common collector and base of its diode-connected portion through a resistor R22 and also to the base of transistor Q107. The emitters of transistors Q107 and Q108 are connected together through a resistor R23. Currents through resistors R22 and R23 establish a base-emitter voltage on transistor Q107 which is less than the base-emitter voltage of transistor Q108. This is effective in establishing a nearly constant current transistor Q107 collector current flowing through resistor R24 to the common emitters of comparator transistors Q105 and Q106 regardless of the noted variations in the comparator supply voltage.

Since integrating capacitor C3 is referenced to the filtered DC supply voltage at pin 1 and on bus 24a, pin 2, connected to the base of comparator transistor Q105 through a resistor R25, is also at the same supply voltage when the integrating capacitor is discharged. Thus, transistor Q105 is cut off. During the strobing peak comparator supply voltage pulses, all of comparator emitter current supply is conducted through transistor Q106 and diode-connected transistor Q12 to pin 6. Transistor Q11 becomes saturated to prevent conduction of the gate driver transistor Q14 for thyristor SCR. When the fault signal voltage exceeds the trip threshold established by the amplifier, integrating capacitor C3 is charged, and the voltage at pin 2 and the base of comparator transistor Q105 decreases. As this voltage approaches the peak reference voltage at the base of comparator transistor Q106, transistor Q105 begins to conduct a portion of the emitter supply current from transistor Q107 when the comparator is strobed. When the base voltage on transistor Q105 drops below the peak reference voltage, the collector current of transistors Q105 and Q11 exceeds the collector current of transistors Q106 and Q12. Consequently, the collector voltage of transistor Q11 rises to produce base drive for transistor Q14. Since the collector current for transistor Q14 is obtained from the filtered supply voltage on bus 24a, a slight decrease in this supply voltage is produced, which decrease is communicated to the base of transistor Q105 via integrating capacitor C3. This regenerative action causes transistor Q105 to rapidly acquire the total emitter supply current which is available as base drive for transistor Q14. This transistor then supplies a current pulse to the gate of thyristor SCR and bypass resistor R26 during the strobing pulse of transistor Q17 and before transistor Q15 is driven into conduction to clamp the thyristor gate. With the thyristor being triggered into conduction, capacitor C1 discharges to establish thyristor latching current while the positive half-cycle of supply current from the line conductor rises in the inductance of the trip solenoid coil TC. This collapses the supply voltage at pin 4 and bus 24, which turns off the comparator and gate drive transistor Q14 and leaves a depressed supply voltage at pin 1 and on bus 24a at a lower than normal level.

If the trip solenoid was not sufficiently activated to effect tripping of the contacts 12 open, the beginning of the next positive half-cycle finds the filtered supply voltage on bus 24a further depressed by the amplifier current drain in the interim. Thus, even if the charge on integrating capacitor C3 has not changed appreciably, the voltage at pin 2 and the base of transistor Q105 is further reduced below the comparator peak reference voltage. Another gate pulse is thus generated to again trigger the thyristor into conduction. The filtered supply voltage is further depressed to insure the generation of a gate pulse at the beginning of the next positive half-cycle if the contacts have not been tripped open.

Thus, a succession of gate pulses are generated for at least four to five cycles to insure reliable tripping. However, if tripping does not occur, the voltage at the base of transistor Q105 will eventually drop to a level effective in turning transistor Q13 on to conduct periodic discharging current pulses into the integrating capacitor. This rapidly raises the voltage at pin 2, and transistor Q105 ceases to conduct during the comparator strobing pulse and thyristor gate triggering is halted. Circuit operation thus returns to normal, and if the fault condition persists, an additional burst of gate pulses are generated after a delay dependent on fault current magnitude. This reset action serves to prevent overheating of the thyristor and trip solenoid coil, particularly important in those situations where the GFCI device is back-fed, i.e., module powered from the load side of the circuit interrupting contacts.

From the foregoing description, it is seen that the thyristor gate triggering pulses are generated early in each positive half-cycle, thus affording ample trip coil activating current and time to initiate tripping of the contacts. It will also be noted that should extreme ground fault current be sensed during a positive half-cycle after the first comparator strobing pulse has occurred, the integrating capacitor C3 can rapidly charge to drive the base voltage of transistor Q105 down to the reduced reference voltage at the base of the transistor Q106 or at least to the peak reference voltage again applied to transistor Q106 at the moment the supply voltage on bus 24 falls out of regulation near the end of each positive half-cycle. In the former case, transistor Q114 is turned on to conduct sufficient collector current from bus 24 via transistor Q16 and resistor R10 to pull the supply voltage downwardly out of regulation. Transistor Q15 goes nonconductive to unclamp the thyristor gate and a triggering pulse is delivered to the thyristor gate. However, there may not be sufficient time left in this positive half-cycle to achieve trip solenoid actuation, and thus actual tripping of the contacts will have to await the next positive half-cycle some eight milliseconds later. This is also true in the latter case, however, the consequent reduction of the supply voltage on bus 24a, as communicated to the base of transistor Q105, will insure the generation of a gate triggering pulse when the comparator is again strobed at the beginning of the next positive half-cycle. It will be appreciated that the normal clamping of the thyristor gate during the major portion of each positive half-cycle, i.e., while the supply voltage on bus 24 is in regulation, greatly reduces the sensitivity of thyristor SCR to transient voltages and leakage currents.

Figure 5:
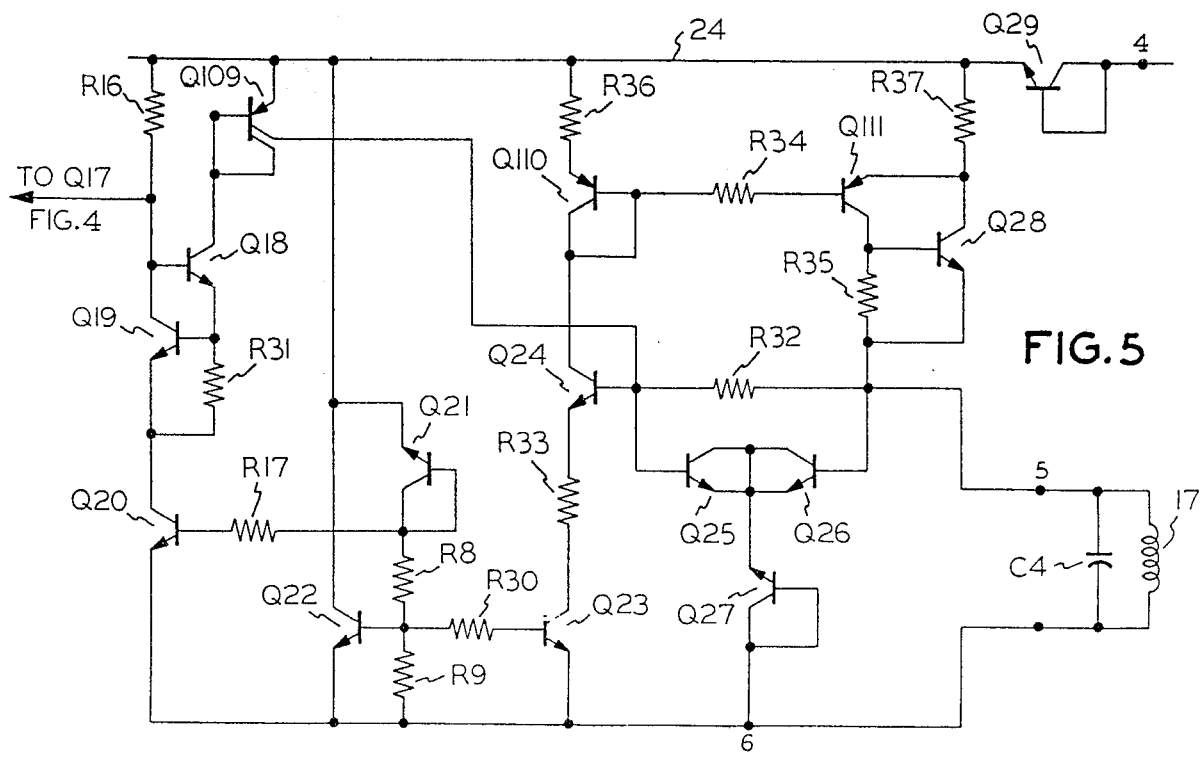
FIG. 5 is a detailed circuit schematic diagram of an oscillator circuit utilized in the ground fault circuit interrupting device of FIG. 1.

The oscillator circuit of GFCI module 10 is disclosed in FIG. 5 and utilizes the teachings of applicant's U.S. Pat. No. 3,986,152, entitled "Negative Impedance Network". This permits connecting one termination of the neutral excitation transformer winding 17 directly to the neutral conductor L and pin 6 with parallel resonant capacitor C4 connected directly across the winding 17 terminations for RF noise suppression. As seen in FIG. 5, when the half-wave supply voltage on bus 24 achieves regulation, zener transistor Q21, in addition to driving transistor Q20 to drop the comparator supply and clamp the thyristor gate, also drives the base of transistor Q23 through resistor R30 to turn on the oscillator. The collector current of transistor Q20 causes transistor Q18 to conduct sufficient current to turn transistor Q19 on and impose the base emitter voltage of this transistor across resistor R31. The collector current for transistor Q18, drawn through the diode-connected portion of dual collector transistor Q109, produces a duplicate current in the other collector thereof. This collector current flows to pin 5 and transformer winding 17 through a resistor R32 of the same value as resistor R31. Thus, a base voltage is applied to transistor Q24 which is one base-emitter voltage more positive than the voltage at pin 5. This is sufficient base voltage to turn transistor Q24 on while the voltage at pin 5 is zero. The resulting collector current of transistor Q24, which flows through a resistor R33 and transistor Q23, is reflected and multiplied by a compound current mirror consisting of transistors Q110, Q111, Q28 and associated resistors R34, R35, R36 and R37. The emitter resistor R36 of transistor Q110 is selected to be many times larger than the emitter resistor R37 of transistor Q111 to provide a desired current amplification or multiplication factor for efficient utilization of the supply current available on bus 24 in exciting the oscillator resonate circuit (capacitor C4 and winding 17). The collector current of transistor Q111 and the emitter current of transistor Q28, the latter transistor being utilized to extend the range of the high current side of the current mirror, are pumped into pin 5 and the resonant circuit. The voltage at pin 5 rises to increase the base-emitter voltage of transistor Q24, thus to draw increased current through the low current side of the current mirror (transistor Q110). The increased current in the low current side produces multiply increased current in the high current side, which is pumped into the resonant circuit. Under these circumstances, a negative impedance is presented to the resonant circuit.

It will be noted that transistor Q23 effectively limits the peak current drawn by transistor Q24 in accordance with its base drive available from zener transistor Q21. If the oscillator current drain on bus 24 starts to pull the half-wave supply voltage out of regulation, the conduction of transistor Q23 cuts down to limit oscillator current. This current limiting function of transistor Q23 assures proper oscillation for all expected values of neutral-to-ground resistance. Also, the thyristor gate clamp is maintained, and spurious comparator strobing is prevented.

When, during a positive half-cycle of the oscillator voltage at pin 5, transistor Q23 is pulled out of saturation to limit current, constant current continues to flow into pin 5 and the voltage thereat continues to rise in accordance with RLC parameters of the resonant circuit. As current transfers from capacitor C4 to the inductance of winding 17, the oscillating voltage begins to fall along a sinusoidal waveform. When pin 5 swings slightly negative, transistor Q24 is cut off to remove the output current of the current mirror, and the resonant circuit simply rings through the negative half-cycle. Oscillation at a high frequency of, for example, 7000 Hz, continues for the duration of each positive half-cycle of the AC line voltage while the half-wave supply voltage on bus 24 is in regulation. During the negative half-cycles of the line voltage, the oscillator is inactive.

As is well understood in the art, if the neutral conductor N becomes faulted to ground downstream from module 10 (FIG. 1), the high frequency oscillatory current generated in winding 17 induces a circulating current in the neutral conductor tending to unbalance the differential current transformer. If the neutral-to-ground fault impedance is sufficiently low as to have the potential of conducting line-to-ground fault current back onto the neutral conductor and thus degrade the sensitivity of the differential current transformer to line-to-ground fault current, the oscillator generated circulating current sufficiently unbalances the differential transformer to produce a trip. In the unlikely event the neutral fault impedance is so low—less than 0.3 microhenrys and 10 milliohms—oscillation will cease. However, the oscillator then becomes a half-wave, sixty-Hertz current source driving winding 17 to produce a current unbalance in the differential current transformer sufficient to cause tripping.

From the foregoing description, it is seen that there is provided a GFCI module of improved reliability and reduced size and cost. Noise immunity is greatly increased, and thus the possibility of nuisance tripping is dramatically reduced. Since only the amplifier is operated on a full-wave basis, power consumption is significantly reduced. It will be noted that once the comparator determines that tripping of the circuit contacts is called for, all available power can be called upon to produce the thyristor gate triggering pulses. That is, as seen in FIG. 4, collector current for transistor Q14, the source of gate triggering pulses, is drawn from the filtered, full-wave supply at pin 1, as well as the unfiltered half-wave supply on bus 24. As the transistor Q14 collector current pulls the voltage on bus 24 out of regulation, the oscillator is shut off, making its normal operating current available for thyristor triggering. Triggering of the thyristor is thus afforded priority as to all available power supply current to insure hard gate pulses effective in reliably converting the thyristor to its fully conductive state. Sufficient current activation of the trip coil TC to achieve solenoid actuation is therefore assured.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An integrated circuit for utilization in a ground fault circuit interrupting device including a differential current transformer having a secondary winding in which is developed a fault signal proportional to any imbalance in the currents flowing in the line and neutral conductors of an AC power distribution circuit occasioned by a line-to-ground fault, a neutral transformer having a primary winding which is driven to develop a differential transformer imbalancing current in the neutral conductor if faulted to ground through a desensitizing low impedance, separable contacts for interrupting at least the line side of the distribution circuit, a trip solenoid, a thyristor operating when triggered into conduction to draw activating current through the solenoid to initiate separation of the contacts, an integrating capacitor and an energy storage filter capacitor, said integrated circuit comprising, in combination:

A. a differential amplifier having a first input connected with the differential current transformer secondary winding for amplifying a fault signal developed therein by a current imbalance exceeding a pre-selected threshold level established by a bias voltage applied to a second amplifier input, said amplifier developing an integrating capacitor charging current of a magnitude exponentially related to the fault signal magnitude;
B. an oscillator connected to drive the primary winding of the neutral transformer;
C. a comparator for sensing the voltage developing across the integrating capacitor;
D. a thyristor gate driver controlled by said comparator for producing gate pulses to trigger the thyristor into conduction when the voltage across the integrating capacitor achieves a pre-established reference level; and
E. a power supply connected across the line and neutral conductors and including
  (1) a first regulated supply voltage section,
  (2) a second supply voltage section connected with the filter capacitor,
  (3) a first diode conducting half-wave rectified line current to said first section from the AC distribution circuit; and
  (4) a second diode conducting half-wave rectified line current from said first section to said second section,
  (5) whereby said first section develops a regulated half-wave rectified supply voltage and said second section develops an essentially full-wave rectified supply voltage,
  (6) said second section connected to apply DC supply voltage to said amplifier and charging current to the integrating capacitor on a full-wave basis, and
  (7) said first section connected to apply DC supply voltage to said oscillator and comparator on a half-wave basis.

2. The integrated circuit defined in claim 1, wherein said gate driver is connected to said power supply such as to draw gate pulse current from said second power supply section and from said first power supply section through said second diode.

3. The integrated circuit defined in claim 1, wherein said amplifier includes a first output transistor connected to draw integrating capacitor charging current from said second power supply section in response to positive half-cycles of a fault signal exceeding said threshold level and a second output transistor connected to draw integrating capacitor charging current from said second power supply section in response to negative half-cycles of a relatively high level fault signal well in excess of said threshold level.

4. The integrated circuit defined in claim 1, wherein said amplifier includes means supplying a constant, low level discharge current to the integrating capacitor from said second power supply section, whereby to drain away any spuriously accumulated charge on the integrating capacitor.

5. The integrated circuit defined in claims 1, 2, 3 or 4, wherein said power supply includes first and second terminals to which electrical connections are respectively made from the line and neutral conductors of the AC distribution circuit, said integrated circuit including switch means connected across said first and second power supply input terminals, said switch means alternatively connecting the relatively negative voltage-going one of said first and second power supply input terminals to the integrated circuit substrate during each cycle of the AC distribution circuit line voltage.

* * * * *